United States Patent [19]
Simmons et al.

[11] Patent Number: 6,019,317
[45] Date of Patent: Feb. 1, 2000

[54] AIR-DROPPED, PRECISION-GUIDED, PAYLOAD DELIVERY SYSTEM

[75] Inventors: John A. Simmons, West Covina; Eric Knutson, Lancaster; Joseph M. Wurts, Valencia; John T. Reynolds, Lancaster, all of Calif.

[73] Assignee: Lockheed Martin Corporation, Palmdale, Calif.

[21] Appl. No.: 09/088,085

[22] Filed: Jun. 1, 1998

[51] Int. Cl.⁷ .................................................. B64B 1/04
[52] U.S. Cl. ................................ 244/138 R; 244/137.3; 244/31; 244/137.1
[58] Field of Search ........................... 244/138 R, 137.1, 244/146, 140, 141, 137.3, 31

[56] References Cited

U.S. PATENT DOCUMENTS

| | | | |
|---|---|---|---|
| 3,921,944 | 11/1975 | Morrison | 244/138 R |
| 3,944,169 | 3/1976 | Bede | 244/138 R |
| 4,166,597 | 9/1979 | Seifert | 244/160 |
| 4,832,288 | 5/1989 | Kendall | 244/160 |
| 4,958,565 | 9/1990 | Koch | 244/138 R |
| 5,388,786 | 2/1995 | Hirose | 244/138 R |
| 5,568,902 | 10/1996 | Hurley, Jr. | 244/138 R |
| 5,899,415 | 5/1999 | Conway et al. | 244/152 |

*Primary Examiner*—J. Woodrow Eldred
*Attorney, Agent, or Firm*—Robert A. Schruhl

[57] ABSTRACT

A protective ballute for a payload launched from an airborne platform includes an elongated shroud member, gas delivery apparatus for filling the shroud member with a lighter-than-air gas to inflate the shroud member. A payload as ballast is provided at one end portion of the shroud member for rendering the ballute heavier than air. Flight control and guidance apparatus is carried by said shroud member for determining a flight path and attaining a predetermined target landing site. A mechanism carried by the shroud member releases the payload from the shroud member upon reaching the landing site while maintaining said shroud member in its inflated state. The shroud member then rises or "floats" away from said landing site to another removed location, or if desired will self-destruct.

10 Claims, 2 Drawing Sheets

AIR-DROPPED, PRECISION-GUIDED, PAYLOAD DELIVERY SYSTEM

BACKGROUND OF THE INVENTION

1. Field of the Invention

The present invention relates generally to payload delivery systems used with aircraft, and more particularly to payload delivery system which comprises an inflatable shroud or "ballute", guidance equipment, direction modification equipment, and a payload detachment system so that the ballute can release a payload, depart the delivery location and later be retrieved and reused, allowed to "float" away, or merely self-destroyed.

2. Description of Related Art

Current day conflicts typically tend to be covert. The element of surprise is paramount. One way to accomplish a covert action is to deliver manpower, armament, and supplies into enemy territory without alerting the enemy that he is being invaded.

Various devices have been used throughout modern history to achieve soft landings when delivering such necessary payloads, including parachutes attached directly to the cargo, piloted and unpiloted cargo containers outfitted with wings or lighter than air attachments.

U.S. Pat. No. 4,166,597 to Seifert et al. discloses an inflatable space vehicle which includes an outer skin that is inflated when the vehicle is launched from a "mother" ship so that a protective shroud is formed. U.S. Pat. No. 4,832,288 to Kendall et al. discloses a recovery system for space vehicles, booster, equipment, and other payloads, in which an inflatable paracanopy is used to protect the payloads. The present invention does not contemplate an inflatable protective shroud for a deliverable payload. Rather, the present invention discloses a detachable and expendable delivery device or vehicle whose function is to guidably deliver a payload and then detach for immediate translocation from the delivery location/area or be self-destructed.

Typically, control surfaces and guidance mechanisms are incorporated into delivery systems used for depositing a payload at a predetermined location. The control surfaces and guidance mechanisms assist in maneuvering the payload through air space between its discharge, for example from a "mother" airship or ground location, to its reaching the designated target location.

The principal problem encountered in systems of this sort is that the delivery systems transport the payload at a rapid descent, and therefore seldom provide an opportunity for delivery system recovery, or controlled descent. Against this background of known technology, the inventors have developed a recoverable payload delivery system which includes an inflatable shroud for enabling or facilitating a payload to slowly descent from a high altitude launch, as from a mother aircraft, to a target location, as well as automatic removal of the delivery system from the delivery location or site.

The ballute or inflatable shroud is typically packaged in line with the payload and inflates immediately following launch of the delivery system. The ballute employs control surfaces and guidance apparatus for precision delivery of the heavier-than-air system to a targeted location. When the ballute reaches its target location, a release mechanism is actuated to separate the ballute from the payload, rendering the delivery system lighter than air. The ballute then rises or "floats" away from the target location, or merely self-destructs at a distance and high altitude.

OBJECTS AND SUMMARY OF THE INVENTION

It is therefore an object of the present invention to provide a novel payload delivery system which will overcome all the disadvantages and drawbacks of known similar payload delivery systems.

Another object of the present invention is to provide a novel payload delivery system which will enable controlled descent of the payload after it has been launched from an aircraft, and also permit recovery or intentional loss of the delivery system after the payload has been deposited at a target location.

Still another object of the present invention is to provide a novel payload delivery system which includes an inflatable shroud, wherein the shroud embodies control surfaces and a guidance mechanism that together enables controlled slow descent of the shroud and payload to a target location.

Yet another object of the invention is to provide a payload delivery system that includes an inflatable shroud, which detaches from the payload after landing at a target location and either moves away to another location for retrieval and reuse, or self-destructs.

DETAILED DESCRIPTION OF THE INVENTION

The following description is provided to enable any person skilled in the art to make and use the invention, and sets forth the best modes contemplated by the inventor of carrying out his invention. Various modifications, however, will remain readily apparent to those skilled in the art, since only the generic principles of the present invention have been defined herein specifically to provide teachings for a payload delivery system that encompasses many long sought after features.

Figure 1:
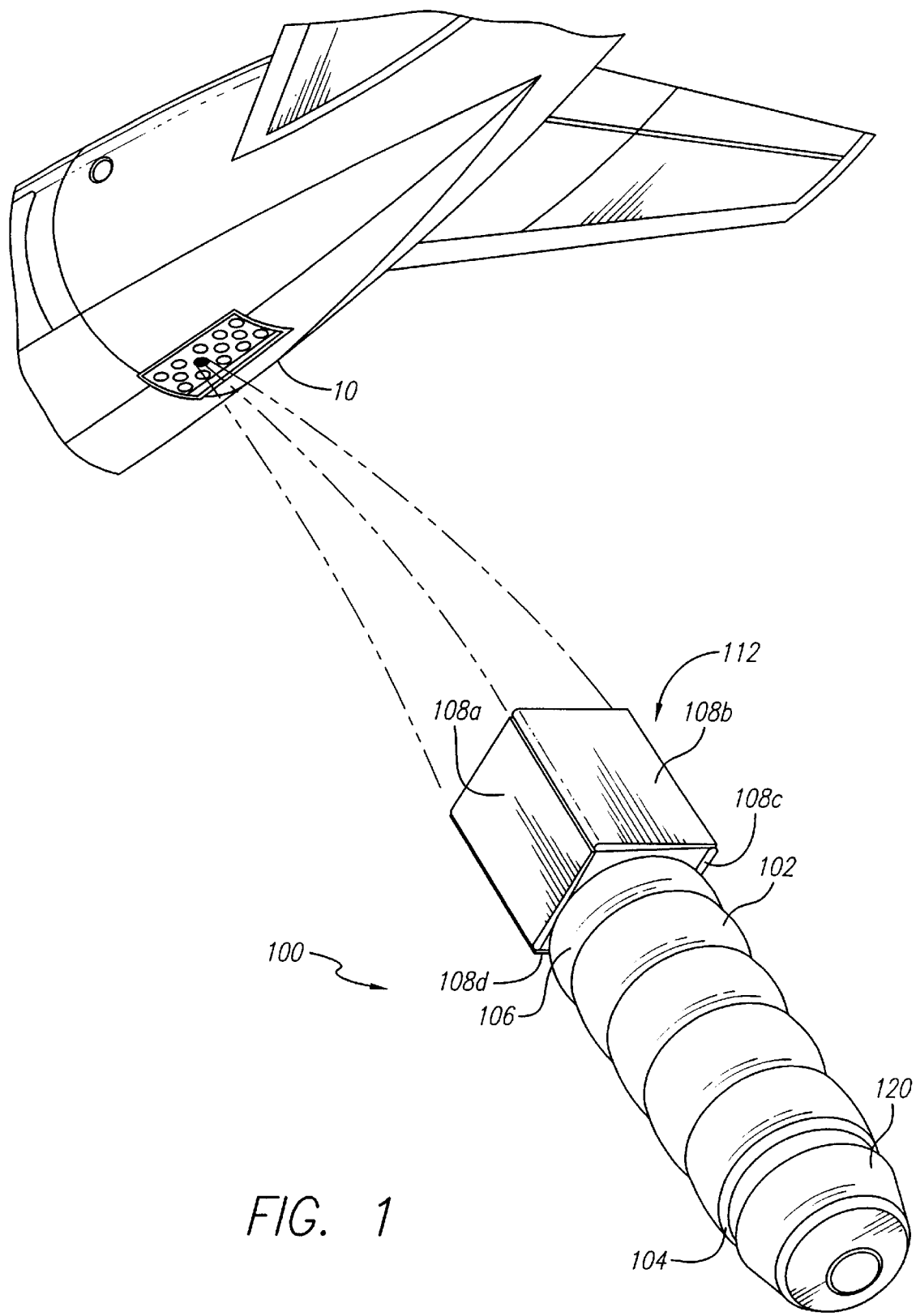
FIG. 1 depicts a ballute assembly immediately after being launched or dropped from an aircraft in flight.
Figure 2:
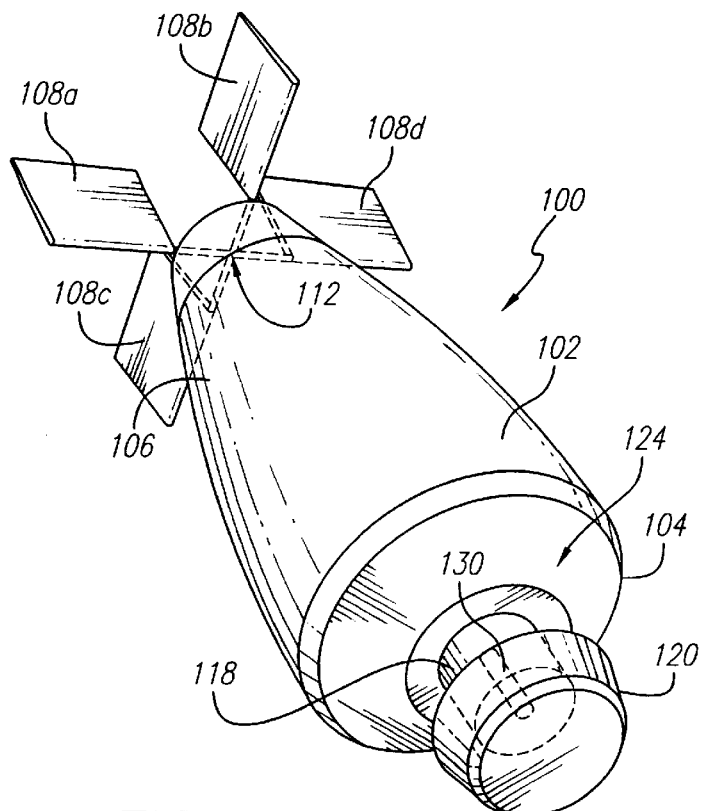
FIG. 2 is shows the ballute assembly after the shroud has been inflated.

Referring first to FIGS. 1 and 2, the ballute assembly 100 according to the present invention is shown immediately after having been released from the launch bay 10 of an aircraft. Release, as used herein, refers to ejection or launch, as well as mere dropping. The ballute assembly 100 includes a shroud 102 having an elongated (shown in FIG. 2). Preferably, the body has a cylindrical, teardrop configuration. The body includes a forward end portion 104 and a rearward end portion 106. The forward end portion houses electronic sensors for determining position (can include GPS equipment), airspeed, angular orientation, and other information useful in controlling the flight and target acquisition requirements of the ballute assembly 100. The rearward end portion includes a plurality of control paddles 108a, 108b, 108c and 108d that are movable about hinged connections with a supporting framework 112 and initially folded into a compact rectangular configuration before launch.

Upon launch the shroud is inflated via the introduction of a lighter than air gas. The shroud thus becomes a buoyant "bladder" or balloon.

After launch, all of the control paddles unfold and are erected into positions (see FIG. 2) relative to one another where surfaces of the paddles extend substantially coextensively with the longitudinal axis L—L of the cylindrical shroud. The supporting framework 112, to which the paddles 108a, 108b, 108c, 108d are hingedly coupled, is arranged substantially normal to the longitudinal axis L—L of the shroud.

The surfaces of the paddle-like rudders cooperate with the inflated shroud during descent to control its direction and orientation in response to, and as a direct result of analyses performed by, on-board computing equipment 118. The paddle-like rudders are shown in FIG. 2 to have assumed an unfolded position wherein opposing paddle-like rudders are disposed in substantially the same plane and adjacent rudder paddles are disposed in substantially normal planes. All of the paddle-like rudders have air deflecting faces arranged parallel, and leading edges arranged normal, to the longitudinal axis of the ballute assembly. The paddle-like rudders can be unfolded from their pre-launch positions using a spring driven assembly, using deflector devices mounted on the leading edges of the folded rudders so that ambient air impacts the deflectors and forces the rudders from their folded positions. Other rudder unfolding mechanisms are possible, such as an electronically controlled pyrotechnic actuator.

Figure 3:
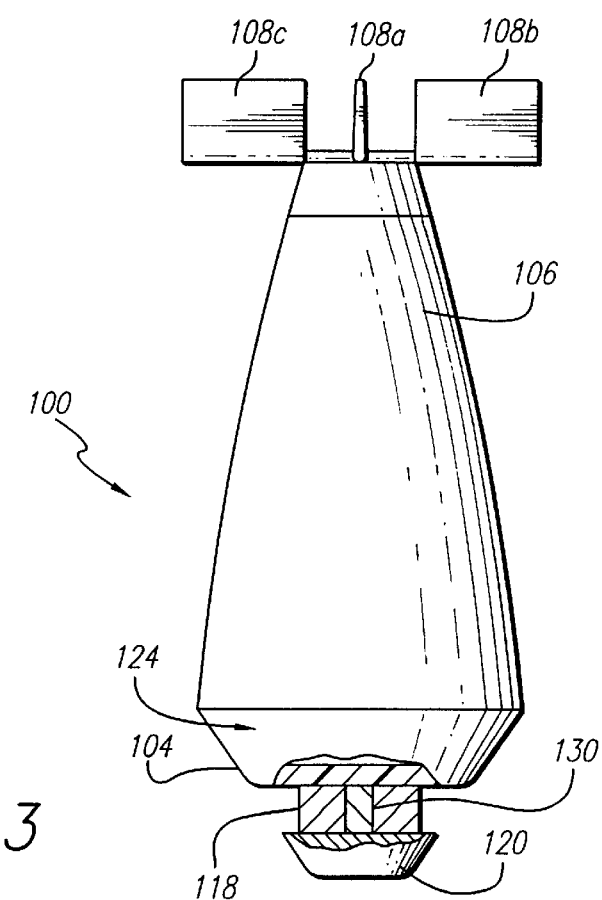
FIG. 3 is a cross-sectional view of the ballute and payload according to the present invention.

Referring now to FIG. 3, the inflated shroud is shown to include a payload 120 at the forward portion of the ballute assembly. The payload renders the assembly heavier than air, and maintains the assembly in a "nose-down" orientation during its descent. The shroud is preferably inflated with helium gas or hydrogen, which renders the inflated shroud lighter-than-air. The gas is released from an appropriate pressurized storage container (not shown) housed inside the initially deflated shroud immediate after "launch" of the ballute assembly. The amount of helium released for inflating the shroud does not overcome the weight of the payload, but is sufficient to impart enough buoyancy to the inflated shroud to permit it to descend in a slow, controllable, manner. Upon impact of the front end portion with the ground, release mechanisms 130 (such as impact-responsive explosive or frangible bolts or pins) cause separation of the payload 120 from shroud 102. With the payload now on the ground, the shroud can, under the influence of the helium, lift away from the targeted deposit site and remove itself to another location where it can later be retrieved and ultimately reused. Alternatively, if necessary, the shroud can self-destruct through an appropriate detonation mechanism housed within the shroud.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. A protective ballute for a payload launched from an airborne platform, comprising:

an elongated shroud member, and means for filling said shroud member with a lighter-than-air gas to inflate said shroud member and render it buoyant, a payload at one end portion of said shroud member for rendering the ballute heavier than air, flight control and guidance means, carried by said shroud member, for determining a flight path and attaining a predetermined target landing site, and means for releasing said payload from said shroud upon reaching said landing site while maintaining said shroud member in said inflated state, whereby said shroud member can rise from said landing site to another removed location.

2. The ballute of claim 1, wherein said flight control means is carried by said shroud member at an end portion remote from said one end portion.

3. The ballute of claim 2, wherein said flight control means includes a set of air impacting paddles that, upon launch of said ballute from the airborne platform, unfold from a stored position into an operative position.

4. The ballute of claim 3, wherein said air impacting paddles comprise blade elements hingedly connected to a supporting framework secured to said shroud member, said supporting framework being located on the end portion of said shroud member which is located above said one portion.

5. The ballute of claim 1, and further including data processing means for optimizing operation of the flight control means to attain the landing site.

6. The ballute of claim 1, wherein said flight control means comprises an assembly of air-deflecting paddle elements carried by said shroud member at an end portion thereof remote from said one end portion of said shroud member, said paddle assembly including frame means and a plurality of blade elements pivotably supported on said frame means.

7. The ballute of claim 6, wherein said flight control means further comprises sensor means for determining information during the descent of said ballute and means for driving the blade elements of said paddle assembly into various positions about said frame means in response to information obtained by said sensor means.

8. The ballute of claim 7, wherein said flight control means further includes data processing means for information obtained by said sensor means.

9. The ballute of claim 7, wherein said frame means comprises a framework depending from the rearward end of said shroud member and disposed in a plane arranged substantially normal to the longitudinal axis of said shroud member, and said paddle elements extend rearwardly of said framework.

10. The ballute of claim 9, wherein said paddle elements are folded against the rearward end of said shroud member prior to launch of said ballute from the airborne platform, and after launch of said ballute, said paddle elements deploy into positions relative to said shroud member and each other so that adjacent paddle elements are arranged substantially normal to one another and opposing paddle elements are arranged substantially parallel with one another.

\* \* \* \* \*